US011011764B2

(12) United States Patent
Filangi et al.

(10) Patent No.: US 11,011,764 B2
(45) Date of Patent: May 18, 2021

(54) FUEL CELL SYSTEM WITH A SINGLE COOLANT LOOP

(71) Applicant: Safran Aerotechnics, Plaisir (FR)

(72) Inventors: Sebastien Filangi, Montigny le Bretonneux (FR); Charles Foncin, Saint Cyr l'Ecole (FR)

(73) Assignee: Safran Aerotechnics, Plaisir (FR)

( * ) Notice: Subject to any disclaimer, the term of this patent is extended or adjusted under 35 U.S.C. 154(b) by 0 days.

(21) Appl. No.: 14/903,462

(22) PCT Filed: Jul. 23, 2014

(86) PCT No.: PCT/IB2014/063353
§ 371 (c)(1),
(2) Date: Jan. 7, 2016

(87) PCT Pub. No.: WO2015/011664
PCT Pub. Date: Jan. 29, 2015

(65) Prior Publication Data
US 2016/0380280 A1  Dec. 29, 2016

Related U.S. Application Data

(60) Provisional application No. 61/857,422, filed on Jul. 23, 2013.

(51) Int. Cl.
*H01M 8/04* (2016.01)
*H01M 8/04029* (2016.01)
(Continued)

(52) U.S. Cl.
CPC ......... *H01M 8/04074* (2013.01); *B64D 11/02* (2013.01); *B64D 11/04* (2013.01);
(Continued)

(58) Field of Classification Search
CPC ......... H01M 8/04074; H01M 8/04014; H01M 8/04029; H01M 8/04044; H01M 8/04052;
(Continued)

(56) References Cited

U.S. PATENT DOCUMENTS 6,447,692 B1 * 9/2002 Momoda ................ C09K 5/063
16/10
7,128,025 B1   10/2006 Westhoff et al.
(Continued)

FOREIGN PATENT DOCUMENTS

| CN | 100463266 C | 2/2009 |
| EP | 1289039 | 3/2003 |

(Continued)

OTHER PUBLICATIONS

Europe Patent Application No. 14771382.0, Communication (including search results) dated Feb. 15, 2017.
(Continued)

*Primary Examiner* — Cynthia H Kelly
*Assistant Examiner* — Aaron J Greso
(74) *Attorney, Agent, or Firm* — Kilpatrick Townsend & Stockton LLP

(57) ABSTRACT

Embodiments of the present invention provide a single coolant loop (40) that can be used for cooling at least two systems (100, 26) that are generally operable at two different temperatures. Rather than providing two separate cooling loops that can provide the two different cooling temperatures, there is provided a single cooling loop (40) that can route, harness, and mix heated coolant so that the two system can be served by a single loop.

20 Claims, 4 Drawing Sheets

(51) Int. Cl.
| | |
|---|---|
| *H01M 8/0432* | (2016.01) |
| *H01M 8/04014* | (2016.01) |
| *H01M 8/04044* | (2016.01) |
| *B64D 11/02* | (2006.01) |
| *B64D 11/04* | (2006.01) |
| *B64D 41/00* | (2006.01) |
| *H01M 8/04007* | (2016.01) |
| *H01M 8/04223* | (2016.01) |
| *H01M 8/04746* | (2016.01) |

(52) U.S. Cl.
CPC ........ *B64D 41/00* (2013.01); *H01M 8/04014* (2013.01); *H01M 8/04029* (2013.01); *H01M 8/0432* (2013.01); *H01M 8/04044* (2013.01); *H01M 8/04052* (2013.01); *H01M 8/04067* (2013.01); *H01M 8/04268* (2013.01); *H01M 8/04358* (2013.01); *H01M 8/04768* (2013.01); *B64D 2041/005* (2013.01); *H01M 2250/20* (2013.01); *H01M 2250/405* (2013.01); *Y02B 90/10* (2013.01); *Y02T 90/40* (2013.01)

(58) Field of Classification Search
CPC ......... H01M 8/04067; H01M 8/04268; H01M 8/0432; H01M 8/04358; H01M 8/04768; H01M 8/04; H01M 2250/045; H01M 2250/20; B64D 11/02; B64D 11/04; B64D 41/00; B64D 2041/05; Y02T 90/36; Y02T 90/32; Y02B 90/16
See application file for complete search history.

(56) References Cited

U.S. PATENT DOCUMENTS

| | | | |
|---|---|---|---|
| 2002/0127448 A1* | 9/2002 | Derflinger | H01M 8/04029 429/434 |
| 2004/0108148 A1* | 6/2004 | Vanderwees | F01P 7/165 180/65.1 |
| 2004/0163861 A1 | 8/2004 | Fukuda et al. | |
| 2007/0141420 A1 | 6/2007 | Voss et al. | |

FOREIGN PATENT DOCUMENTS

| | | |
|---|---|---|
| EP | 1304367 A1 | 4/2003 |
| EP | 1547182 B1 | 7/2008 |
| FR | 2800017 A1 | 4/2001 |
| FR | 2824785 | 11/2002 |
| FR | 2863779 A1 | 6/2005 |
| GB | 2489016 A | 9/2012 |
| JP | S57-005270 | 1/1982 |
| JP | 2003-193948 | 7/2003 |
| JP | 2004278522 A | 10/2004 |
| JP | 2005-353410 | 12/2005 |
| JP | 2007-069829 | 3/2007 |
| JP | 2007-300753 | 11/2007 |
| JP | 2007-328933 | 12/2007 |
| JP | 2010-272460 | 12/2010 |
| WO | 2013128430 A1 | 9/2013 |
| WO | 2013136286 A2 | 9/2013 |
| WO | 2013140306 A1 | 9/2013 |
| WO | 2013142161 A1 | 9/2013 |
| WO | 2015/011664 | 1/2015 |

OTHER PUBLICATIONS

International Patent Application No. PCT/IB2014/063353, Invitation to Pay Additional Fees and Partial Search Report dated Dec. 2, 2014.
International Patent Application No. PCT/IB2014/063353, Search Report dated Mar. 10, 2015.
International Patent Application No. PCT/IB2014/063353, Written Opinion dated Mar. 10, 2015.
International Patent Application No. PCT/IB2014/063353, International Preliminary Report on Patentability dated Feb. 4, 2016.
Japan Patent Application No. 2016-528642, Office Action (including English translation), dated Jun. 5, 2018.
Japan Patent Application No. 2016-528642, Office Action (including English translation), dated Feb. 26, 2019.
China Patent Application No. 2014800416424, Office Action (including English translation), dated Nov. 3, 2017.
China Patent Application No. 2014800416424, Office Action (including English translation), dated Sep. 30, 2018.
China Patent Application No. 2014800416424, Office Action (including English translation), dated Jul. 3, 2019.
Canada Patent Application No. 2917454, Office Action, dated Dec. 3, 2020.
Japan Patent Application No. 2016528642, Office Action, dated Jan. 21, 2020.
China Patent Application No. 201480041642.4, Office Action, dated Jun. 1, 2020.
Europe Patent Application No. 14771382.0, Examination Report, dated Jun. 29, 2020.
Japan Patent Application No. 2016528642, Decision to Grant a Patent, dated Aug. 18, 2020.

* cited by examiner

FUEL CELL SYSTEM WITH A SINGLE COOLANT LOOP

CROSS REFERENCE TO RELATED APPLICATIONS

This application is the U.S. national phase entry of International Application Serial No. PCT/IB2014/063353, filed Jul. 23, 2014, which application is related to and claims the benefit of U.S. Provisional Application Ser. No. 61/857,422, filed Jul. 23, 2013, titled "Fuel Cell System with One Coolant Loop," the entire contents each of which are hereby incorporated by this reference.

FIELD OF THE DISCLOSURE

Embodiments of the present disclosure relate generally to a system that provides a single cooling loop for cooling at least two systems. In a particular embodiment, the systems to be cooled may be a fuel cell system and one or more of its related electronic components. The cooling loop may be used on-board a vehicle, such as an aircraft.

BACKGROUND

Vast numbers of people travel every day via aircraft, trains, buses, and other vehicles. Such vehicles are often provided with components that are important for passenger comfort and satisfaction. For example, passenger aircraft (both commercial and private aircraft) can have catering equipment, heating/cooling systems, lavatories, water heaters, power seats, passenger entertainment units, lighting systems, and other components. A number of these components on-board an aircraft require electrical power for their activation. Although many of these components are separate from the electrical components that are actually required to run the aircraft (i.e., the navigation system, fuel gauges, flight controls, and hydraulic systems), an ongoing concern with these components is their energy consumption. Frequently, such systems require more power than can be drawn from the aircraft engines' drive generators, necessitating additional power sources, such as a kerosene-burning auxiliary power unit (APU) (or by a ground power unit if the aircraft is not yet in flight). Energy from these power sources may have to travel a significant distance to reach the power-consuming components, resulting in loss of power during transmission and a reduction in overall efficiency of power systems. The total energy consumption can also be rather large, particularly for long flights with hundreds of passengers, and may require significant amounts of fossil fuels for operation. Additionally, use of aircraft power typically produces noise and $CO_2$ emissions, both of which are desirably reduced.

The relatively new technology of fuel cell systems provides a promising cleaner and quieter way to supplement energy sources already aboard commercial crafts. A fuel cell system produces electrical energy as a main product by combining a fuel source of liquid, gaseous, or solid hydrogen with a source of oxygen, such as oxygen in the air, compressed oxygen, or chemical oxygen generation. A fuel cell system has several outputs in addition to electrical power, and these other outputs often are not utilized and therefore become waste. For example, thermal power (heat), water, and oxygen-depleted air (ODA) are produced as by-products. These by-products are far less harmful than $CO_2$ emissions from current aircraft power generation processes.

However, fuel cell systems and their related electronic components need to be cooled at some points during their use to prevent overheating. It has commonly been the case to provide two separate cooling loops—one for the fuel cell system and one for its related electronic components. However, this adds weight and additional complexity to aircraft systems, which is undesireable.

BRIEF SUMMARY

Embodiments described herein thus provide a single coolant loop that can be used for cooling at least two systems that are generally operable at two different temperatures. Rather than providing two separate cooling loops that can provide the two different cooling temperatures, there is provided a single cooling loop that can route, harness, and mix heated coolant at various temperatures so that the two systems can be served by a single loop.

In a specific embodiment, there is provided a single coolant loop for cooling a fuel cell system and one or more electronic components in the same loop. The coolant loop may include a coolant pump for moving coolant fluid through the loop and a distributor for routing coolant fluid through one of two paths. The first path may be delivery of coolant fluid through a low temperature heat exchanger and then along the path to cool the one or more electronics components. The second path may be by-pass of the electronics components. This path maintains a higher temperature, as it does not pass the low temperature heat exchanger. The first and second paths can converge at a coolant mixer, which combines coolant from the first path with coolant from the second path. Coolant exiting the coolant mixer is of a desired temperature for cooling the fuel cell system, and it may be delivered to the fuel cell system.

The coolant used to cool the fuel cell system exits the fuel cell system at a higher temperature than at which it entered. The warmer coolant exiting the fuel cell is either (i) routed to a heat storage unit or (ii) by-passes the heat storage unit. The by-passed fluid may be delivered to the distributor to be re-routed through the system again, or it may be delivered through a pre-heat loop, wherein the by-passed fluid is delivered back to the fuel cell in order to deliver warmth for its start up.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

While the embodiments described herein find particular use on-board a passenger aircraft and are generally described in relation thereto, it should be understood that the systems may be used on other vehicles, such as buses, trains, spacecraft, water vessels, or any other appropriate transport vehicle equipped with one or more fuel cell systems. Thus, while the fuel cell technology is discussed herein in relation to use in aircrafts, it is by no means so limited and may be used in any other vehicle.

Figure 1:
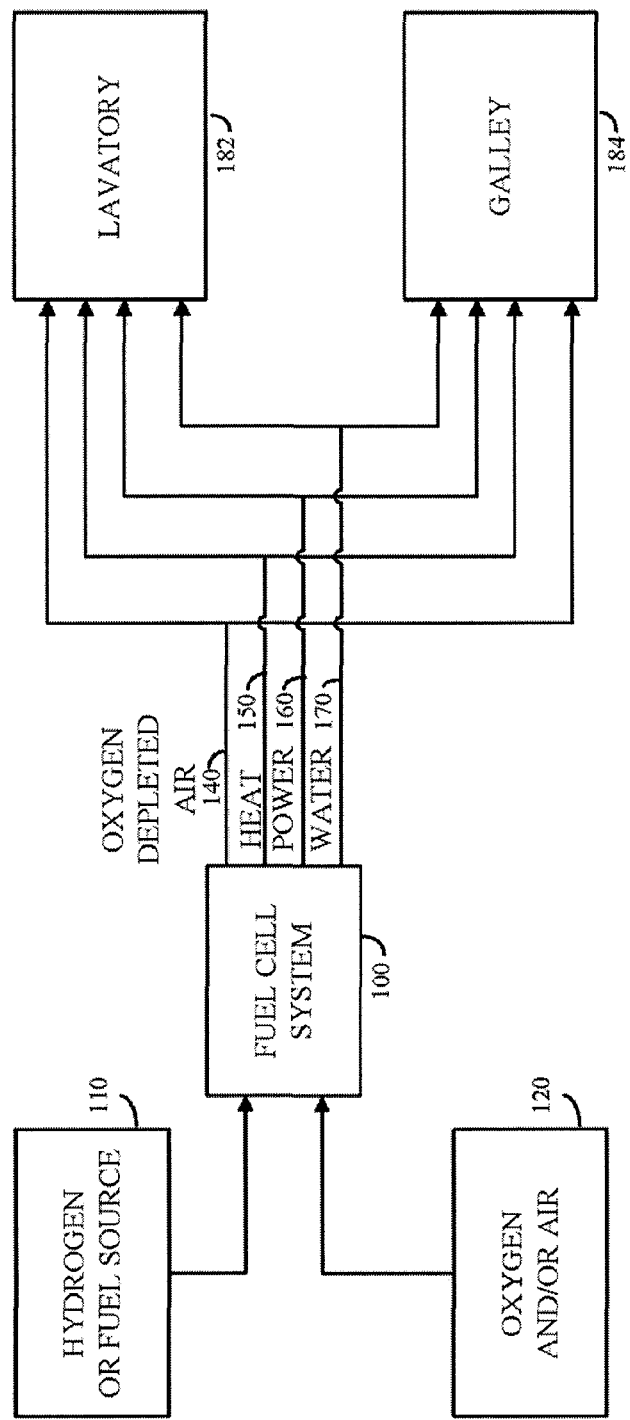
FIG. 1 shows a schematic a fuel cell system, its inputs, and its by-products. This schematic illustrates that the by-products may be used in various locations on-board an aircraft.

Fuel cell systems may be used on-board an aircraft (or other vehicle) for generating power. The power may be routed to any appropriate use. More specifically, a fuel cell system is a device that converts chemical energy from a chemical reaction involving hydrogen or other fuel source and oxygen-rich gas (e.g., air) into electrical energy. As illustrated in FIG. 1, a fuel cell system 100 combines an input of hydrogen or another fuel source 110 with an input of oxygen and/or air 120 to generate electrical energy (power) 160.

As shown, along with the generated electrical energy 160, the fuel cell system 100 produces water 170, thermal power (heat) 150, and oxygen-depleted air (ODA) 140 as by-products. As further illustrated in FIG. 1, some or all of the fuel cell output products of electrical energy 160, heat 150, water 170, and ODA 140 may be used to operate systems aboard the aircraft.

For example, the fuel cell output products can be supplied to operational systems of the aircraft, such as, but not limited to, systems of a lavatory 182 or a galley 184 aboard the aircraft. Output products can additionally and/or alternatively be routed to other operational systems or areas for use where such output products are useful, including, but not limited to, routing heat or heated water to aircraft wings for ice protection, to showers, to the water tank for warming water for hand washing, to the galley for warming water for hot water boilers, to passenger cabins, to passenger seats, or any other location. In other embodiments, the oxygen depleted air may be routed to fuel tanks, passenger seats, or any other location. One or more than one output product can be utilized in any given location, and any given output product may be utilized in one or more locations.

Exemplary, but non-limiting, examples of aircraft systems utilizing fuel cell output products are disclosed in at least the following co-pending applications: International Patent Application No. PCT/US13/030638, entitled "Fuel Cell System Powered Lavatory," filed Mar. 13, 2013; International Patent Application No. PCT/IB2013/052004, entitled "Power Management For Galley With Fuel Cell," filed Mar. 13, 2013; International Patent Application No. PCT/IB2013/051981, entitled "Wing Ice Protection System Based On A Fuel Cell," filed Mar. 13, 2013; and International Patent Application No. PCT/IB2013/051979, entitled "Vehicle Seat Powered By Fuel Cell," filed Mar. 13, 2013.

Accordingly, by-products from the fuel cell system power generation (such as heat 150, water 170, and ODA 140) may be routed to other systems on-board the aircraft (or other vehicle) for further use. Without directing the heat 150 to an on-board beneficial use, the heat would otherwise be expelled into the environment. This can have an adverse effect on electronics and other equipment (in the area where the heat is expelled) that may need to be cooled in use.

Figure 2:
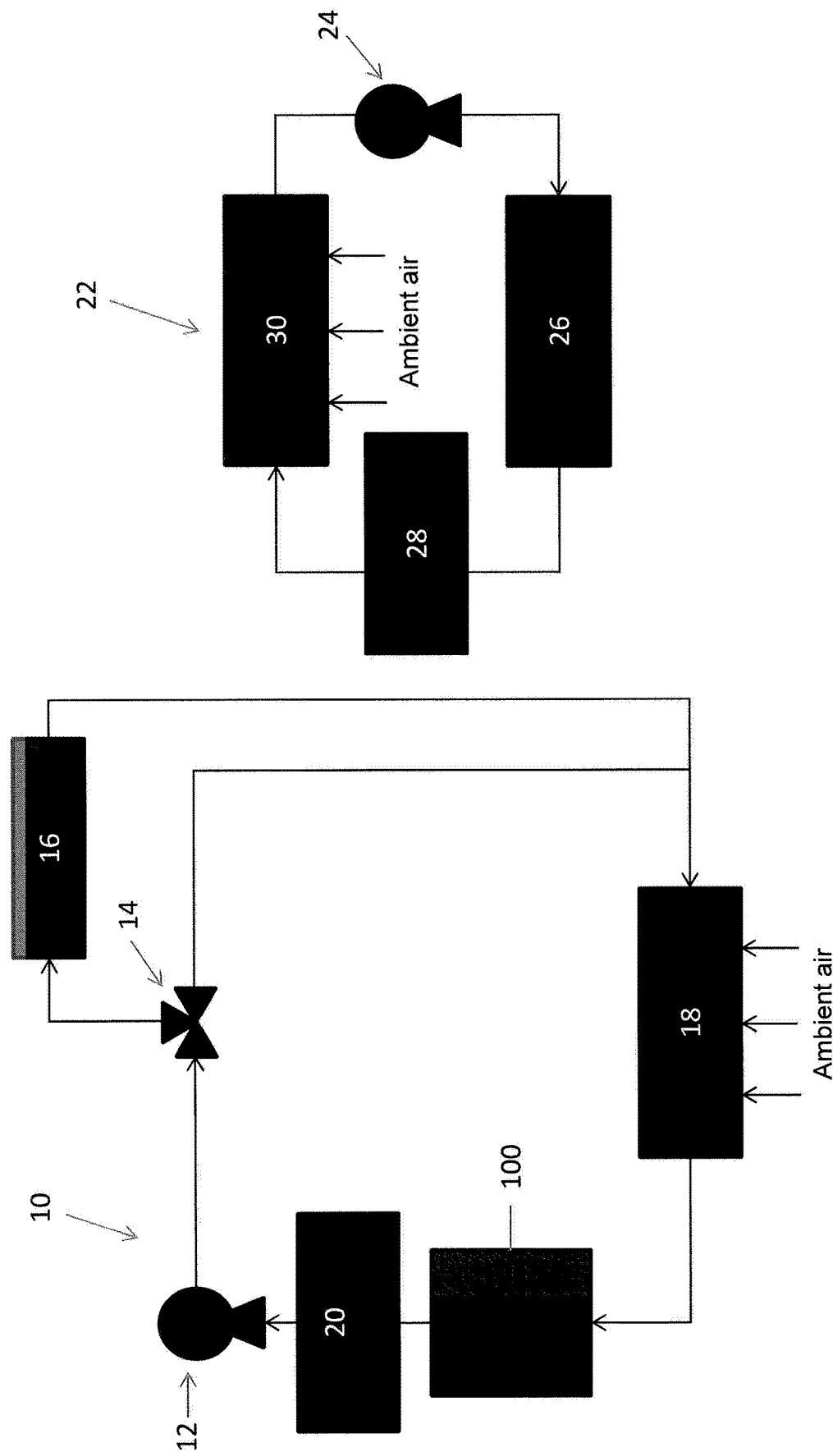
FIG. 2 shows a schematic of two separate thermal circuits that are used to cool a fuel cell system and electronic components.

Because of the heat generated by their operation, fuel cell systems 100 need to be cooled during use. A standard low temperature fuel cell operates at about 60-80° C. As shown in FIG. 2, a fuel cell cooling loop 10 may be provided. This cooling loop 10 uses a cooling fluid that flows along the path shown. The cooling fluid can be routed along the path via a coolant pump 12. The coolant pump 12 routes the fluid to a valve 14. This valve 14 is commonly a 3-way valve that can route the cooling fluid to a deionizer system 16 or to allow the fluid to travel along to a high temperature heat exchanger 18.

The fuel cell 100 is generally cooled with a water based coolant fluid (e.g., often Glysantin), for which electric conductivity has to be maintained at low level. Accordingly, the valve may route fluid to the deionizer system 16 to remove ions that make the fluid conductive (because conductive fluid can be detrimental to the fuel cell system 100). For example, if the conductivity of the fluid is increasing, the valve 14 may route the fluid to the system 16. If the conductivity of the fluid is at an acceptable level, the valve 14 may instead direct the fluid to the heat exchanger 18.

The high temperature heat exchanger 18 can transfer heat from the fluid to ambient air in order to deliver fluid that has been cooled to the fuel cell system 100. The fuel cell 100 is then cooled to the desired temperature by the cooled fluid that exits the heat exchanger 18. After the fluid cools the fuel cell system 100, it is thermally conditioned by a fuel cell system thermal conditioning unit 20. This may be necessary because a fuel cell system 100 needs oxygen and/or air fed to it to create the desired reaction. The gasses fed to it the fuel cell 100 or that are a by-product of the fuel cell reaction may need to be conditioned. The coolant pump 12 then continues to move the fluid through the system as required.

FIG. 2 also shows an unrelated second cooling loop 22 that is used to cool electronics systems on-board the vehicle. Most electronics systems operate at between about 50-60° C. This second cooling loop 22 also uses a coolant pump 24 to move fluid through the loop 22. The coolant pump 24 delivers cooled fluid to the electronic components 26 to be cooled. After the fluid cools the electronic components 26, it may be thermally conditioned by a thermal conditioning unit 28. In one embodiment, the thermal conditioning unit may be an air cooler. The coolant pump 12 then continues to move the fluid through a low temperature heat exchanger 30.

Use of these two separate cooling loops 12, 22 had generally been necessary because of the different cooling temperatures of the different systems to be cooled. The coolant fluid used may be a mixture of glycol and water, Glysantin, ethylene glycol, or any other coolant.

It is, however, not optimal to provide two separate cooling loops. The use of two separate loops requires two separate cooling pumps and two separate heat exchanger units with blowers. However, reducing weight on-board vehicles, and particularly aircraft, is of primary concern. Yet because the operating temperatures of the fuel cell and its associated electronic components (or other electronic components on-board the aircraft) are not identical, combining the cooling loops has not been possible to date.

Figure 3:
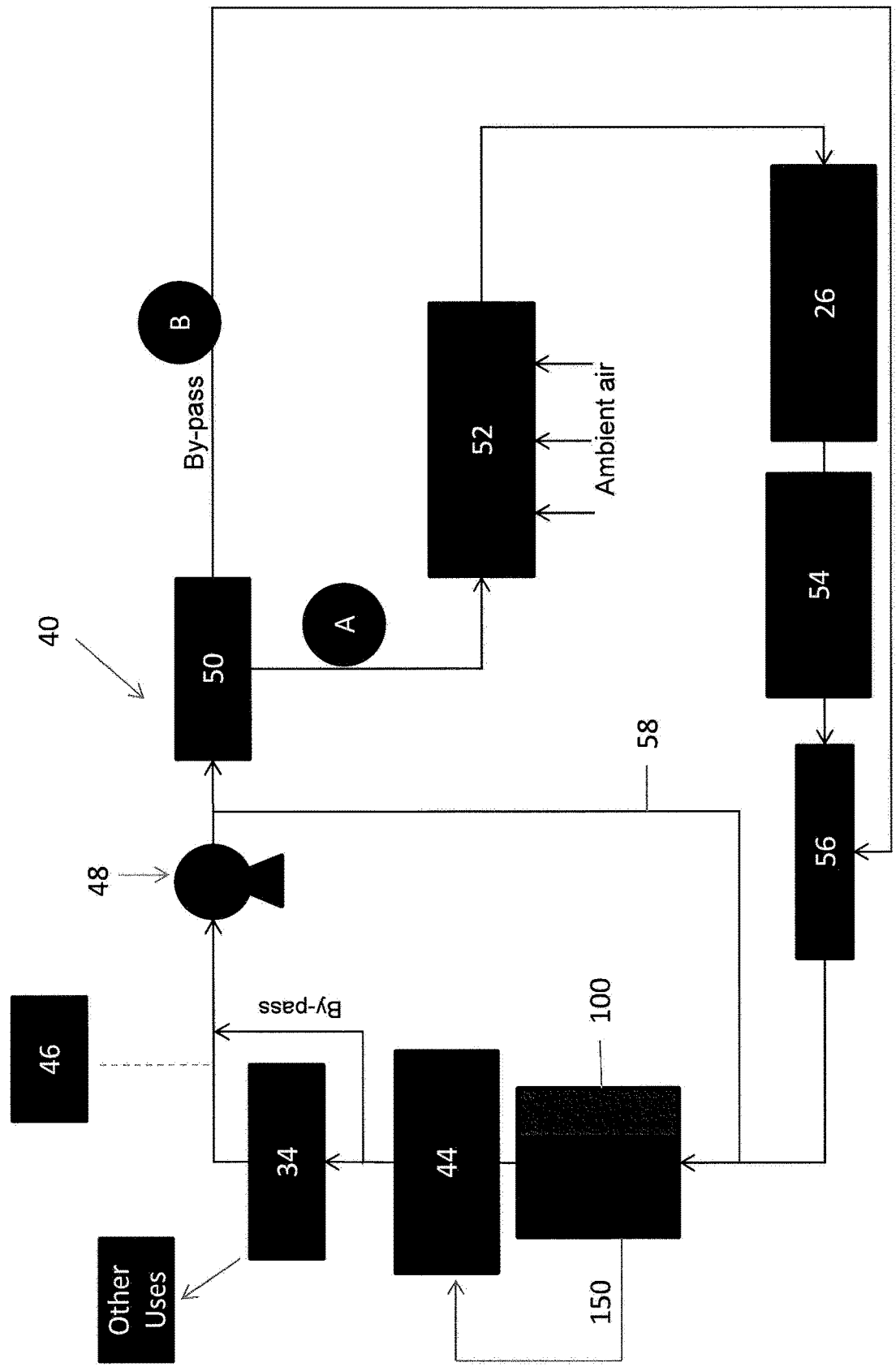
FIG. 3 shows a schematic of a single coolant loop.

The present inventors determined how to combine the cooling systems into one coolant loop 40, as shown in FIG. 3. This single coolant loop 40 routes cooling fluid to both the fuel cell system 100 and to on-board electronic components 26 (which may be fuel cell electronics or any other electronics). It is beneficial due to its use of a single pump and a single heat exchanger.

One way for this single cooling loop 40 to achieve the desired temperature differential is by harnessing the heat 150 generated by the fuel cell system 100 for later use on-board the vehicle in a heat storage unit 34. Operation of the fuel cell system 100 generates heat 150. This heat may be used to condition or re-condition gasses for use in the system by being passed through a fuel cell system thermal conditioning unit 44. Then this heat may be stored in a heat storage unit 34. Heat storage unit 34 may be a water reservoir, a thermodynamic cycle, a phase change material, or any other means for storing the heat for later use. For example, the heat may be used for other uses, such as for re-filling of the water boiler, to warm hand-washing water, or any other on-board use. This re-use of heat can help decrease the electricity energy required to be supplied by the fuel cell 100 and can improve the global system efficiency.

A system controller 46 may be provided that can coordinate the flow through the cooling loop 40, depending upon the needs of the aircraft for heat 150 as a fuel cell by-product. For example, the system controller may receive temperature information from the higher and lower temperature systems (i.e., the fuel cell system and the electronics components) and can route coolant fluid through the coolant loop as needed based on the temperature information. If heat is not needed for use on-board (nor expected to be needed based on the current air temperatures or flight schedule), then the controller 46 may cause the heat storage unit 34 to be by-passed. Instead, the heat 150 may be delivered to the coolant fluid, which is routed through the coolant loop system 40 via a single coolant pump 48.

Although the controller 46 and coolant pump 48 is shown at a particular locations in FIG. 3, it should be understood that they may be located anywhere along the coolant loop 40 as necessary. It is generally desired that only a single coolant pump 48 be used in order to reduce system weight and cost, although this is not required. Moreover, other components in the schematic shown may be moved elsewhere. The general goal is to provide the desired flow of coolant fluid and the desired exchange of heat prior to delivery of the coolant fluid to the particular systems described.

The coolant fluid used in the system may be any appropriate coolant fluid. However, in one embodiment, it has been found particularly useful to use a dielectric coolant fluid. This can render the coolant fluid circuit more simple, reliable, and permits removal of the deionizer system 16 of the prior art system. The dielectric coolant can be mixed into the single coolant loop 40 disclosed, for cooling the two primary systems (the fuel cell system 100 and the electronic components 26). The dielectric property of the coolant means that it does not conduct electricity and will not generate ions. Such coolants are generally more inert and do not degrade as easily as some other fluids. The fluid used can be temporarily or permanently dielectric. Non-limiting examples of potential coolants that may be used in connection with the disclosed coolant loop 40 include but are not limited to Galden, which is a PFPE (perfluoropolyether), PAO (polyaromatic polyolefin), petroleum derived coolants, oil based coolants, or any other appropriate coolant fluid.

If the coolant fluid bypasses the heat storage unit 34, it may be routed appropriately via a distributor 50. Distributor 50 may be a valve or any structure with outlets sized to separate inflow of fluid into outward sub-flows. In one particular embodiment, the distributor 50 may be an electronically controlled valve that adjusts positions based on temperature and other inputs. In flow route A, the fluid is routed to a low temperature heat exchanger 52 and then on to the electronic components 26.

In flow route B, the fluid bypasses flow route A and is routed to a coolant mixer 56 for delivery to the fuel cell system 100. The distributor 50 determines where to send the fluid based on temperature needs from the electronic components 26 and the fuel cell system 100. For example, if cooling of the electronic components 26 is required, the distributor 50 generally routes fluid along path A. If cooling of the electronic components 26 is not required, the distributor 50 may then route fluid along path B. The distributor 50 may receive temperature input in any form. For example, the distributor 50 may receive temperature input in the form of an inlet temperature reading from the fuel cell 100. As another example, the distributor 50 may receive temperature input in the form of a temperature reading from the electronic components 26. Any appropriate temperature feedback loop may be provided so that the distributor can route the fluid as appropriate.

Referring now to flow route A, the low temperature heat exchanger 52 causes the fluid to be cooled to about 50-60° C., due to input of ambient air into the heat exchanger 52. The incoming ambient air can be replaced by any cold source or source of air that has a generally low temperature. Cooling the fluid to about 50-60° C. provides fluid at the desired temperature for routing through the electronic components 26 in order to lower their temperature due to heat generated by their operation. Because heat is transferred to the cooling fluid during the electronics cooling step, a second fuel cell thermal conditioning unit 54 may be provided. This unit 54 may be provided in order to lower the temperature of the fluid leaving the electronic components 26.

The fluid leaving the second fuel cell thermal conditioning unit 54 is delivered to a coolant mixer 56. Coolant mixer 56 is provided in order to mix the fluid leaving the second fuel cell thermal conditioning unit 54 with fluid that enters the coolant mixer through path B, which bypasses electronic components. The fluid in path B is warmer than the fluid in path A. Path B fluid has bypassed the electronic components, and it generally contains at least some warmth from heat 150 leaving the fuel cell system 100. The coolant mixer 56 combines cooled fluid from path A with warmer fluid from path B. The coolant temperature from the two incoming streams of coolant (flow path A and flow path B) is generally homogeneous at the outlet of the mixer. Fluid exiting the coolant mixer 56 is thus between about 60-80° C., which is the desired operating temperature for the fuel cell.

FIG. 3 also shows a short pre-heat loop 58. This pre-heat loop 58 is provided to deliver heat to the fuel cell system 100 for start-up. In some instances, it may be desirable to start the fuel cell system 100 when it is cold. However, the preferable operational temperature for the fuel cell system 100 is between about 60-80° C. In this case, the fuel cell needs to have an amount of heat delivered to it in order to be functional. Accordingly, pre-heat loop 58 routes heat leaving the fuel cell system 100 before it reaches the distributor 50. The loop 58 may harness heat from the heat storage unit 34. The loop 58 may harness heat from the warmed coolant leaving the fuel cell system 100. The loop 58 routes one or more sources of this heat back to the fuel cell through the pre-heat loop 58 in order to provide warmth for fuel cell start-up.

Although one potential arrangement of the various components of the coolant loop 40 has been shown, it should be understood that the components may be arranged differently. It is generally desired that the coolant flow function as described in order to cool the fuel cell system 100 and the electronic components 26.

The systems described herein are useful in connection with any appropriate fuel cell system 100, which may include but is not limited to a Proton Exchange Membrane Fuel Cell (PEMFC), a Solid Oxide Fuel Cell (SOFC), a Molten Carbonate Fuel Cell (MCFC), a Direct Methanol Fuel Cell (DMFC), an Alkaline Fuel Cell (AFC), or a Phosphoric Acid Fuel Cell (PAFC). Any other existing or future fuel cell system technology, including, but not limited to, a hybrid solution, may also be used.

In summary, the use of a single low temperature heat exchanger 52 with a passive (or active) distributor 50 and a by-pass way allows management of the fuel cell temperature and the electronics temperatures in their respective optimal temperature ranges. This can achieved using only a single coolant pump 48 and a single air blower (for the low temperature heat exchanger 52). Depending upon the environmental conditions, at least one or more components can be removed due to natural and efficient cooling. The cooling circuit is not limited to cooling a fuel cell and/or its electronics system, but may be used for any and all applications that may need cooling or heating on-board an aircraft.

Example 1

A single coolant loop for cooling at least two systems having different operating temperatures, the single coolant loop comprising:
(a) a coolant pump for moving coolant fluid through the loop;
(b) a distributor for routing coolant fluid through one of two paths;
(c) a first path, comprising delivery of coolant fluid through a heat exchanger and to cool a first system;
(d) a second path, comprising by-pass of the first system;
(e) wherein the first and second paths converge at a coolant mixer, wherein the coolant mixer combines coolant from the first and second paths.

In this example, the first system may be one or more electronic components and the second system may be a fuel cell system.

Example 2

A single coolant loop for cooling a fuel cell system and one or more electronic components in the same loop, comprising:
(a) a coolant pump for moving coolant fluid through the loop;
(b) a distributor for routing coolant fluid through one of two paths;
(c) a first path, comprising delivery of coolant fluid through a low temperature heat exchanger and then to cool the one or more electronics components;
(d) a second path, comprising by-pass of the electronics components;
(e) wherein the first and second paths converge at a coolant mixer, wherein the coolant mixer combines coolant from the first and second paths;
(f) wherein coolant exiting the coolant mixer is delivered to the fuel cell system;
(g) wherein warmer coolant exiting the fuel cell either (i) is routed to a heat storage unit or (ii) by-passes the heat storage unit.

Example 3

Figure 4:
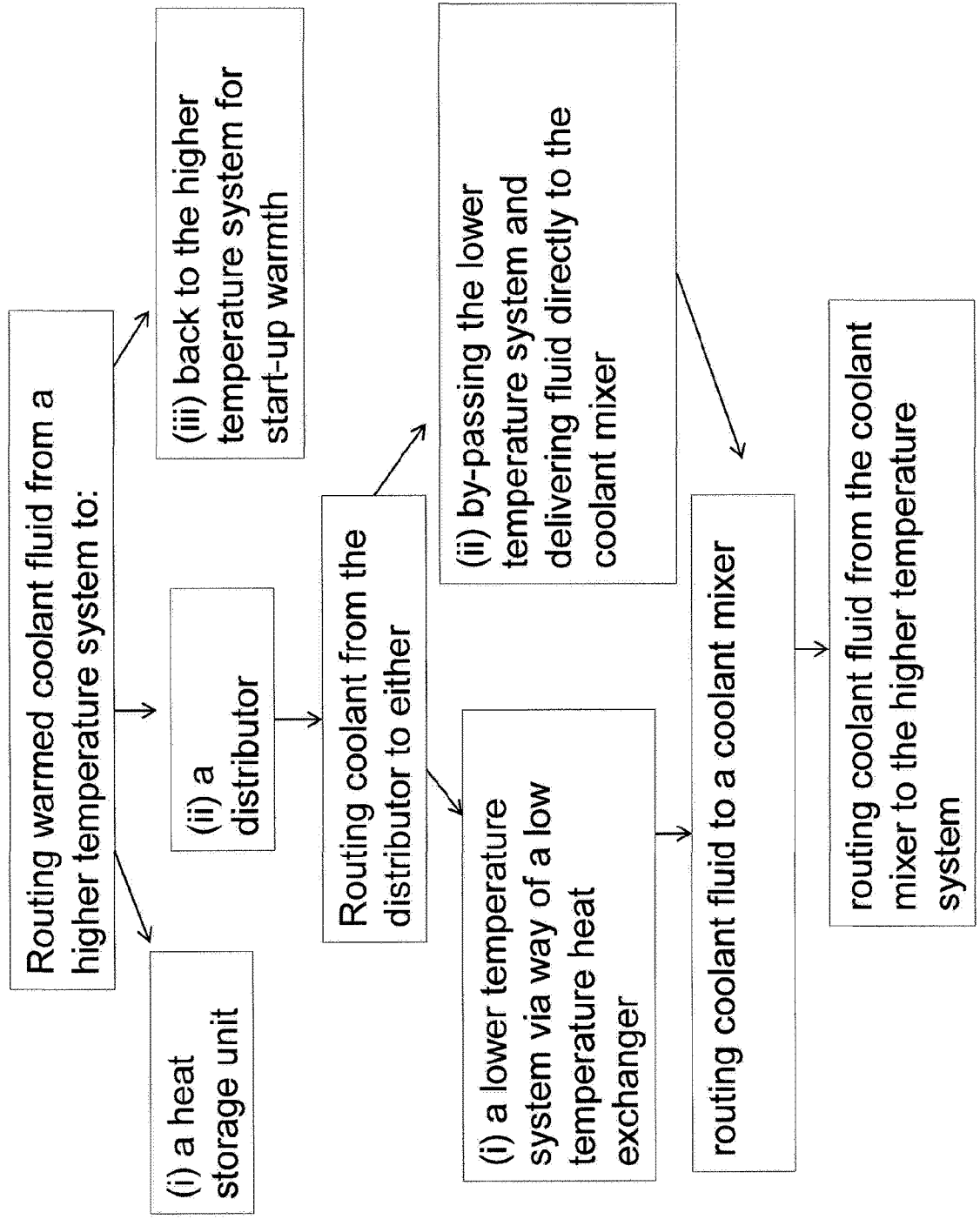
FIG. 4 shows a flow chart of optional coolant heat transfer.

As shown in FIG. 4, the disclosure also relates to a method of routing coolant along a single loop for cooling a higher temperature system and a lower temperature system. The method includes (a) routing warmed coolant fluid from the higher temperature system to either (i) a heat storage unit (ii) a distributor, or (iii) back to the higher temperature system for start-up warmth; (b) routing the coolant from the distributor either to (i) the lower temperature system via way of a low temperature heat exchanger or (ii) by-passing the lower temperature system; (c) routing coolant fluid from the lower temperature system to a coolant mixer; and (d) routing coolant fluid from the coolant mixer to the higher temperature system.

Changes and modifications, additions and deletions may be made to the structures and methods recited above and shown in the drawings without departing from the scope or spirit of the invention and the following claims.

What is claimed is:

1. A single coolant loop for cooling at least a first system and a fuel cell system, wherein the fuel cell system has an operating temperature different from the first system, comprising:
(a) a coolant pump for moving a coolant fluid through the single coolant loop;
(b) a distributor for routing the coolant fluid through a first path or a second path;
(c) the first path comprising a heat exchanger and the first system;
(d) the second path comprising a by-pass of the first system;
wherein the first and second paths converge at a coolant mixer that combines the coolant fluid from the first and second paths,
wherein the coolant fluid is routed from (1) the fuel cell system to one of
(i) a heat storage unit,
(ii) the distributor, or
(iii) a short pre-heat loop that routes the coolant fluid before it reaches the distributor back to the fuel cell system for start-up warmth, and then
(2) along the second path, wherein the coolant fluid is routed directly from the distributor to the coolant mixer, or
(3) along the first path, wherein the coolant fluid is routed directly from the distributor to the heat exchanger, directly from the heat exchanger to the first system, from the first system to the coolant mixer, and from the coolant mixer to the fuel cell system.

2. The single coolant loop of claim 1, wherein the coolant fluid comprises a dielectric coolant fluid.

3. The single coolant loop of claim 1, wherein the first system is electronic components of the fuel cell system.

4. The single coolant loop of claim 1, wherein the first path comprises a thermal conditioning unit arranged between the first system and the coolant mixer, wherein the coolant fluid is routed from the thermal conditioning unit to the coolant mixer.

5. The single coolant loop claim 1, further comprising a fuel cell thermal conditioning unit arranged between the fuel cell system and the distributor, wherein coolant fluid is routed from the fuel cell system to the fuel cell system thermal conditioning unit.

6. The single coolant loop of claim 5, wherein the coolant fluid is routed from the fuel cell system thermal conditioning unit to the heat storage unit.

7. The single coolant loop of claim 6, further comprising a by-pass for routing the coolant fluid directly to the distributor while by-passing the heat storage unit.

8. The single coolant loop of claim 1, further comprising a system controller for receiving information about temperatures of the first system and the fuel cell system and for controlling the routing of the coolant fluid through the coolant loop to direct heat where needed.

9. The single coolant loop of claim 1, wherein the distributor comprises an electrically controlled valve or a structure with outlets sized to separate inflow of fluid into outward sub-flows.

10. The single coolant loop of claim 1, wherein the heat storage unit comprises a water reservoir, a thermodynamic cycle, or a phase change material.

11. The single coolant loop of claim 1, wherein the coolant fluid that by-passes the heat storage unit is routed to the distributor.

12. The single coolant loop of claim 1, further comprising a pre-heat loop, wherein coolant fluid that by-passes the heat storage unit is routed to the fuel cell system for start-up heat.

13. A method of routing a coolant fluid along a single loop for cooling a first system and a fuel cell system, the method comprising:
   (a) routing the coolant fluid from the fuel cell to either
      (i) a heat storage unit;
      (ii) a distributor; or
      (iii) back to the fuel cell system for warmth;
   (b) then, directly routing the coolant fluid from the distributor either to (i) a first path comprising a heat exchanger and the first system, or (ii) a second path by-passing the first system;
   (c) then directly routing the coolant fluid from the first path or the second path to a coolant mixer that combines the coolant fluid from the first and second paths; and
   (d) then directly routing the coolant fluid from the coolant mixer to the fuel cell system.

14. The method of claim 13, wherein the coolant fluid comprises a dielectric coolant fluid.

15. The method of claim 13, wherein the first system comprises one or more electronic components of the fuel cell system.

16. The method of claim 13, further comprising capturing heat generated by the heat storage unit as a by-product from the fuel cell system.

17. The method of claim 13, further comprising passing the coolant fluid that leaves the first system through a thermal conditioning unit prior to delivery to the coolant mixer.

18. The method of claim 17, wherein the thermal conditioning unit comprises an air cooler.

19. The method of claim 13, further comprising passing the coolant fluid leaving the fuel cell system through a thermal conditioning unit.

20. The method of claim 13, wherein the routing of the coolant fluid is directed by a system controller that receives temperature information from the fuel cell system and the first system and that routes coolant fluid through the coolant loop as needed based on the temperature information.

* * * * *